United States Patent
Lim et al.

(10) Patent No.: US 7,417,813 B2
(45) Date of Patent: Aug. 26, 2008

(54) OVERLAPPING DATA TRACK ACCESS

(75) Inventors: AikChuan Lim, Singapore (SG); Edmun ChianSong Seng, Singapore (SG); Xiong Liu, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 324 days.

(21) Appl. No.: 10/854,303

(22) Filed: May 26, 2004

(65) Prior Publication Data

US 2005/0275962 A1    Dec. 15, 2005

(51) Int. Cl.
 *G11B 27/36* (2006.01)
(52) U.S. Cl. .................................................. 360/31
(58) Field of Classification Search .................. None
 See application file for complete search history.

(56) References Cited

U.S. PATENT DOCUMENTS

| | | | |
|---|---|---|---|
| 5,347,648 A |   | 9/1994  | Stamm et al. |
| 5,357,381 A |   | 10/1994 | Yasuda et al. |
| 5,596,458 A | * | 1/1997  | Emo et al. ................ 360/48 |
| 5,835,429 A |   | 11/1998 | Schwarz |
| 5,893,164 A |   | 4/1999  | Legg |
| 5,896,239 A |   | 4/1999  | Maki et al. |
| 5,930,448 A | * | 7/1999  | Lee et al. ................ 360/71 |
| 5,987,632 A |   | 11/1999 | Irrinki et al. |
| 6,052,348 A |   | 4/2000  | Belser et al. |
| 6,067,635 A |   | 5/2000  | DeKoning et al. |
| 6,088,177 A | * | 7/2000  | Onoda et al. ................ 360/48 |
| 6,185,063 B1 | * | 2/2001 | Cameron ................ 360/78.04 |
| 6,247,152 B1 |   | 6/2001  | Russell |
| 6,381,088 B1 | * | 4/2002 | Despain et al. .......... 360/77.06 |
| 6,441,981 B1 | * | 8/2002 | Cloke et al. .............. 360/77.08 |
| 6,449,116 B2 | * | 9/2002 | Morris et al. ............. 360/77.04 |
| 6,657,810 B1 | * | 12/2003 | Kupferman .............. 360/77.04 |
| 6,717,763 B2 | * | 4/2004 | Ottesen et al. ................. 360/75 |
| 6,888,693 B2 | * | 5/2005 | Boutaghou et al. ............ 360/75 |
| 6,975,468 B1 | * | 12/2005 | Melrose et al. ............... 360/31 |
| 6,980,383 B2 | * | 12/2005 | Brunnett et al. ................ 360/31 |
| 7,046,476 B1 | * | 5/2006 | Albrecht et al. .......... 360/77.02 |
| 2002/0036848 A1 |  | 3/2002 | Wilson |
| 2002/0036854 A1 |  | 3/2002 | Wilson et al. |
| 2002/0039244 A1 |  | 4/2002 | Wilson |

FOREIGN PATENT DOCUMENTS

JP           61214282 A   *  9/1986

* cited by examiner

*Primary Examiner*—Joseph Feild
*Assistant Examiner*—Daniell L Negrón
(74) *Attorney, Agent, or Firm*—Westman, Champlin & Kelly, P.A.

(57) ABSTRACT

A data recording apparatus includes a surface having a plurality of data tracks with leading track portions. A head moves along head paths over the data tracks to provide data access. The data access has a reduced reliability along a limited number of the leading track portions. Trailing path additions follow the head paths for the limited number of leading track portions. The trailing path additions providing overlapping data access for the limited number of leading track portions.

18 Claims, 6 Drawing Sheets

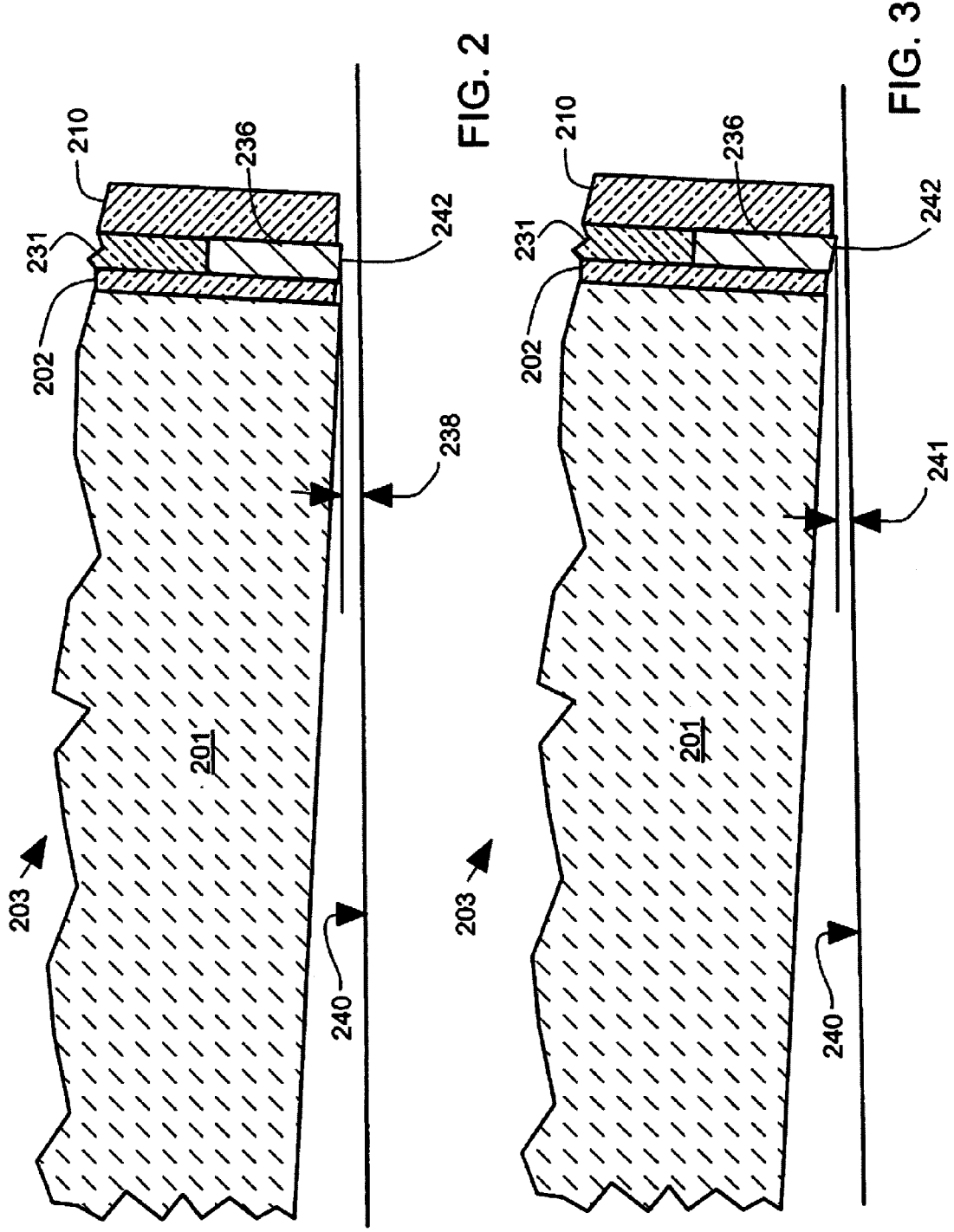

OVERLAPPING DATA TRACK ACCESS

FIELD OF THE INVENTION

The present invention relates generally to data recording apparatus, and more particularly but not by limitation to operation of data recording apparatus to avoid problems due to write current induced pole tip recession.

BACKGROUND OF THE INVENTION

In order to provide faster data access, the rotational speeds of disc drive have increased into the range of 15,000 RPM in new designs. At these increased rotational speeds, the transient thermal response of a write head due to heating by a write current extends over a significant leading portion of a data track. Write current induced pole tip recession (CPTR) varies over a length of a data track due to the transient thermal response.

As the areal density of disc drives increases to provide greater data storage, the nominal write gap between the pole tip and a data storage surface becomes smaller and the variation of CPTR due to transient thermal response becomes a more significant source of low data reliability in writing data.

A method and an apparatus are needed to overcome low data reliability in writing data due to CPTR and other variations in data reliability over the length of a data track.

Embodiments of the present invention provide solutions to these and other problems, and offer other advantages over the prior art.

SUMMARY OF THE INVENTION

Disclosed is a data recording apparatus and method for re-access to data with reduced reliability. The data recording apparatus includes a surface having a plurality of data tracks with leading track portions. A head moves along head paths over the data tracks to provide data access. The data access has a reduced reliability along a limited number of the leading track portions.

Trailing path additions are provided following the head paths for the limited number of leading track portions. The trailing path additions provide overlapping data access for the limited number of leading track portions.

Other features and benefits that characterize embodiments of the present invention will be apparent upon reading the following detailed description and review of the associated drawings.

BRIEF DESCRIPTION OF THE DRAWINGS

FIGS. 2-3 schematically illustrate cross-sections of a read/write head flying over a disc surface at a start (FIG. 2) of a track write operation and at an end (FIG. 3) of a track write operation.

DETAILED DESCRIPTION OF ILLUSTRATIVE EMBODIMENTS

In the embodiments described below, a head path in a data recording apparatus is extended to include a trailing path addition that overlaps a leading path portion of the head path. This trailing path addition is added for data tracks that exhibit reduced data reliability over the leading path portion. Low reliability data accessed during the low data reliability leading path portion is re-accessed during a trailing path addition that overlaps the leading. The reliability of the data along the leading path is increased. Problems with low reliability of data access due to current induced pole tip recession variations are reduced. The re-accessing of the leading portion of the data path can be done during idle times of the disc drive so that the reliability improvement is obtained without significant loss of speed in the data recording apparatus.

Figure 1:
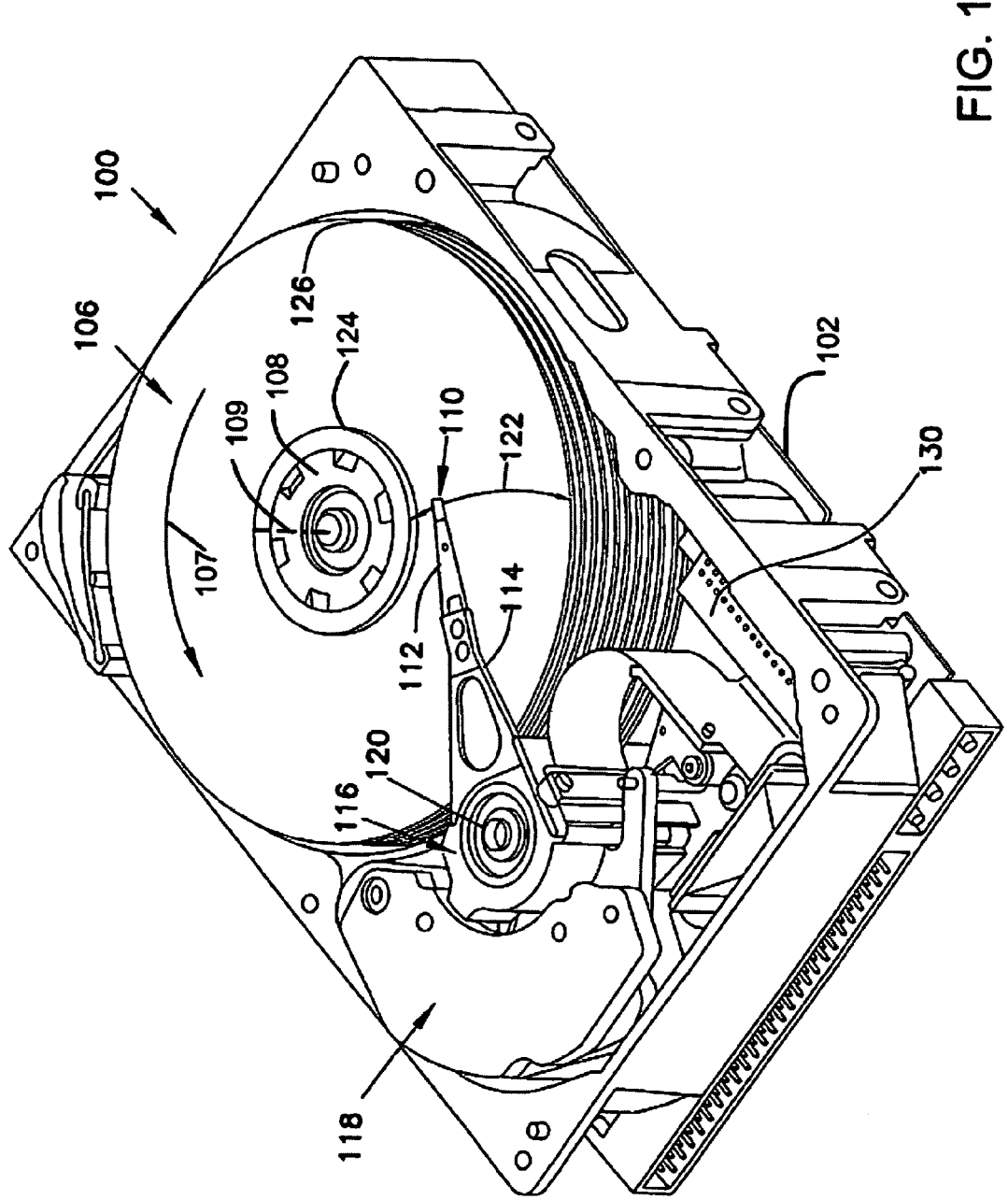
FIG. 1 illustrates an isometric view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIGS. 2-3 schematically illustrate cross-sections of a read/write head 203 flying over a disc surface 240 at a start (FIG. 2, leading path portion) of a track write operation and at an end (FIG. 3, trailing track portion) of a track write operation. As the rotational speeds of discs in disc drives increase toward 15,000 RPM in new designs, the length of time for a track write operation is correspondingly decreasing to about 8 milliseconds. A write current through a write transducer 236 dissipates power during the track write operation and heats up the write transducer 236. During this short track write operation, the temperature of the write transducer 236 is significantly higher at the end (FIG. 3) of the track write operation than it is at the beginning (FIG. 2) of the track write operation. A warm-up time interval for the write transducer is a significant portion of the length of time for the track write operation.

The coefficients of temperature expansion (CTEs) of a substrate 201 and of various deposited layers 202, 236, 210, 231 are typically different from one another. Typically, the magnetic metallic layers in write transducer 236 have larger CTEs, and insulating layers 202, 231, 210 have lower CTEs. All these layers are grown on a substrate 201 that has much larger thermal mass compared to the thermal mass of the layers 231, 210, 202 and the write transducer 236. Due to the different CTEs of materials in various head layers and the localized heating in the write transducer 236 during the track write operation, the shape of the write transducer 236 distorts during the track write operation. The distortion of a shape of the write transducer 236 changes the amount of recession of a write pole tip 242 during the track write operation. This change in recession of the write pole tip 242 during a track write operation is referred to as current-induced pole tip recession (CPTR). A wider write gap 238 is present at a start of a track write operation (FIG. 2). A narrower write gap 241 is present at the end of the track write operation (FIG. 3) due to CPTR. During the track write operation, the write transducer 236 flies above the spinning magnetic recording media surface 240. The fly height (238 and 242) needs to be kept low during the write operation in order to reliably write to the disc. It is found, however, that CPTR causes the fly height to vary from fly height 238 to fly height 242 during the track write operation as described in more detail below in connection with FIG. 4.

Figure 4:
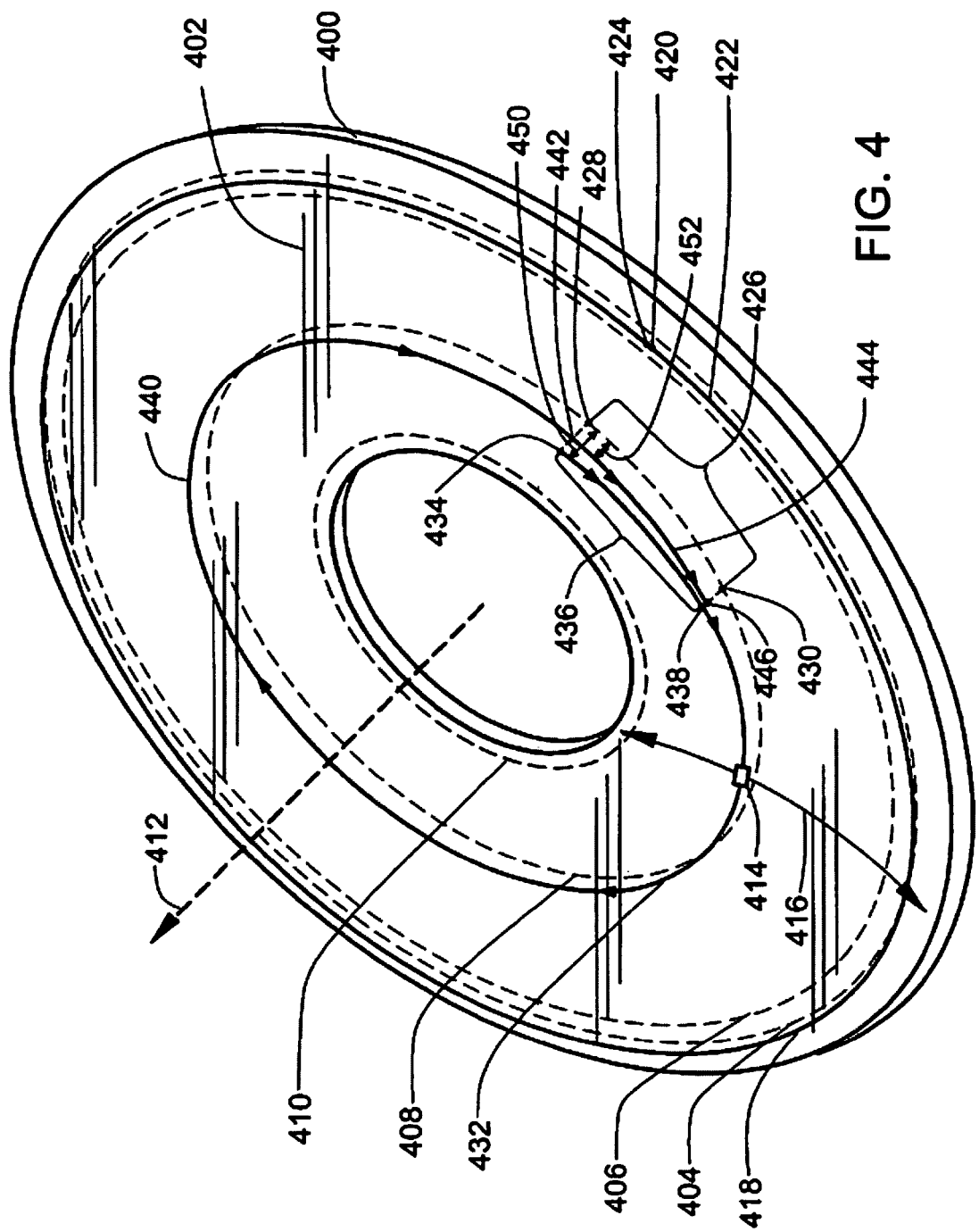
FIG. 4 illustrates an oblique view of a disc that is part of a data recording apparatus.

FIG. 4 illustrates an oblique view of a disc 400 (such as a disc in disc pack 106 in FIG. 1, for example) that is part of a data recording apparatus (such as disc drive 100 in FIG. 1, for example). The disc 400 has a surface 402 (such as surface 240 in FIGS. 2-3, for example) with a large number of data tracks including exemplary data tracks 404, 406, 408, 410 illustrated by dashed lines that are on the surface 402. The disc 400 is spun about a rotational axis 412. A head 414 (such as head 203 in FIGS. 2-3, for example) moves along a path 416 to access individual data tracks.

For a data track 404, for example, the head 414 follows a head path 418 of motion relative to the spinning disc surface 402. The head path 418 is illustrated by a solid line above the data track 404. The head path 418 starts at a start point 420 and moves first along a leading track portion 422 and then completes a generally circular motion to return to end point 424. Interaction between the head 414 and the data track 404 provides an adequate level of reliability for data access over the entire head path 418. The head path 418 comprises a non-overlapping circular path which includes only a single, non-overlapping pass over the data on data track 404.

There are, however, a limited number of data tracks such as the data track 408 that have reduced reliability of data access along a leading track portion such as leading track portion 426 of data track 408. The leading track portion 426 extends from a start point 428 to an end-of-leading-track-portion point 430. For data track 408, a head path 432 starts at start point 434 and extends along a leading head path portion 436 to point 438 and then continues along a main circular path portion 440 to a point 442. A trailing path addition 444 to the head path 432 follows the main circular path portion 440 and continues on to point 446. The trailing path addition 444 overlaps the leading head path portion 436. The trailing path addition 444 is closer to the leading path portion 436, and the leading head path portion 436 is farther away from the leading path portion 436 due to changes in CPTR. The overlapping trailing path addition 444 permits the head 414 to access data in the leading track portion 426 a second time. The reliability of data access during the overlapping trailing path addition 444 is preferably higher than the reliability of access during the leading head path portion 436.

In one preferred arrangement, the access comprises writing the data on the disc 400. In this preferred arrangement, a write pole tip (such as pole tip 242 in FIGS. 2-3, for example) has a wider write gap 450 over the leading path portion 336, and a narrower write gap 452 over the overlapping trailing path addition 444.

Figure 5:
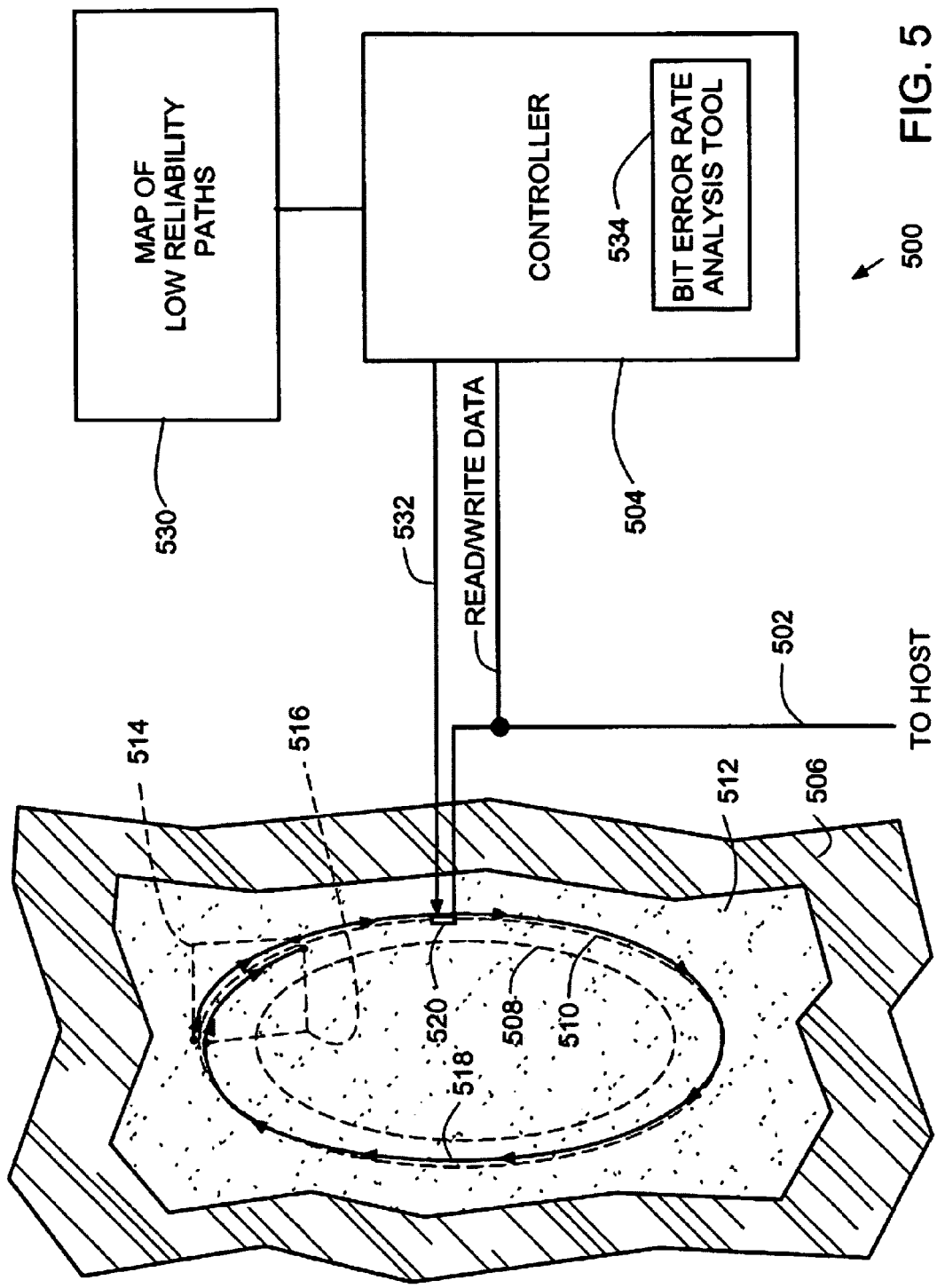
FIG. 5 illustrates a block diagram of a data recording apparatus.

FIG. 5 illustrates a block diagram of a data recording apparatus 500. The data recording apparatus 500 has an active state when it is communicating data with a host system along line 502. The data recording apparatus 500 also has an idle state when it is not communicating data with the host along line 502. In this idle state, a controller 504 performs a process of correcting data errors such as the process described below in connection with FIG. 6.

The data recording apparatus 500 comprises a surface 506 that has a plurality of data tracks such as data tracks 508, 510 on a medium 512 that stores data. Data track 510 includes a leading data track portion (an arc that is part of data track 510) that underlies both a leading head track portion 514 and a trailing head path addition 516. The leading head track portion 514 is part of a head path 518 of a head 520 that accesses data on the data track 510.

The head 520 moves along the head path 518 over the data track 510 to provide data access. The data access has a reduced reliability along a limited number of the leading track portions. The leading track portion of only a limited number of data tracks have reduced reliability as explained above in an example shown in FIG. 4.

The trailing path addition 516 follows the head path 510. The trailing path addition 516 provides overlapping data access for the limited number of leading track portions that have reduced reliability.

A map 530 identifies the limited number of head paths with low reliability access as ascertained by measuring bit error rates for representative sample individual data tracks. The controller 504 couples to the map 530 and controls motion of the head 520 along line 532 to provide the trailing path portion 516 selectively over the limited number of the head paths with reduced reliability. The controller 504 adds the limited number of data tracks to the map 530 in the active state, and errors are corrected during the idle state by re-accessing selected data tracks. The bit error rate error analysis tool 534 adds the limited number of data tracks to the map 530 during the active state, and errors are corrected during the idle state by re-accessing selected data tracks.

Figure 6:
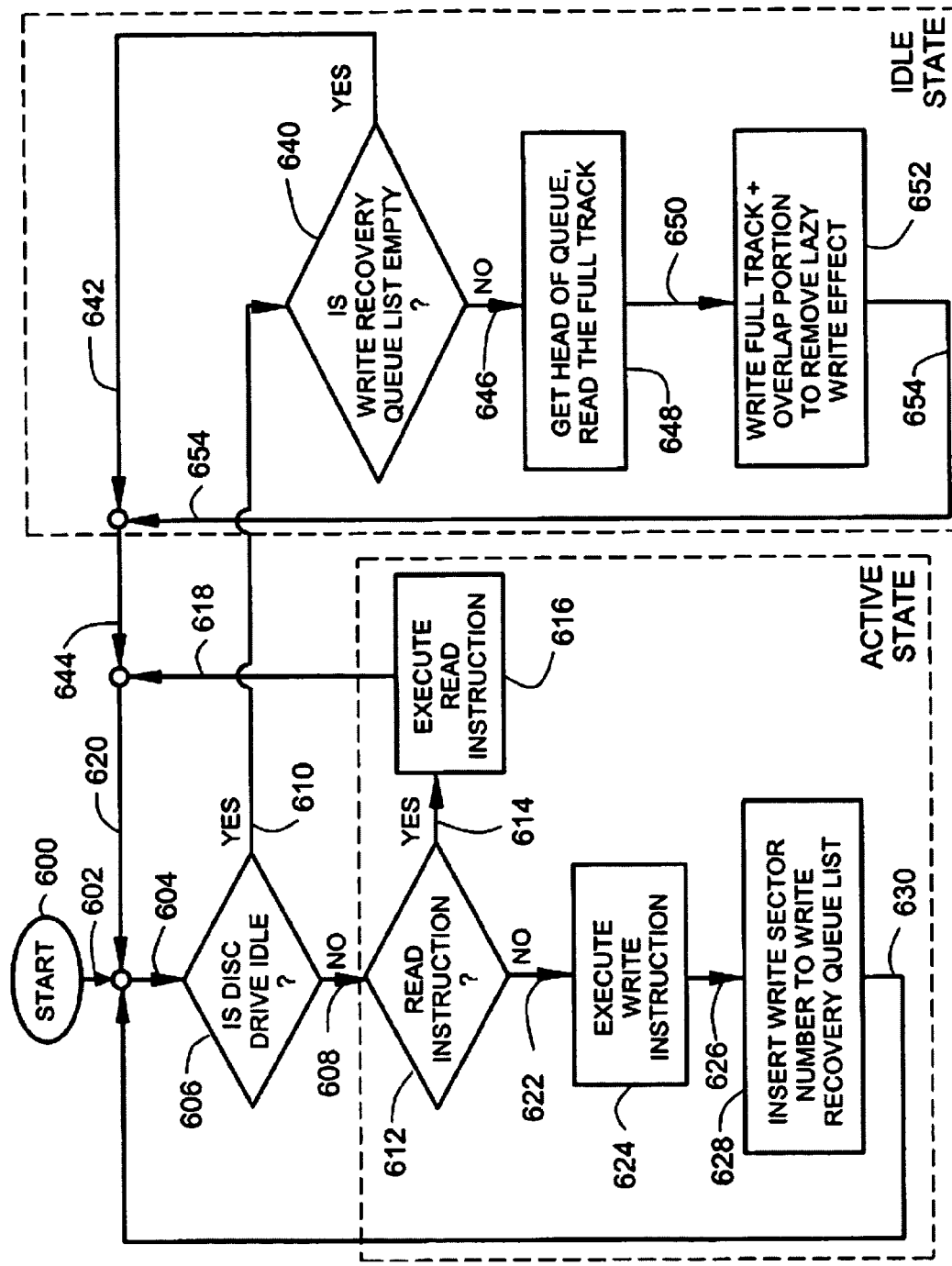
FIG. 6 illustrates a flow chart of an exemplary process in a data recording apparatus.

FIG. 6 illustrates a flow chart of a process in a disc drive for re-accessing leading track portions of data tracks during an overlapping trailing path addition as described above, for example, in connection with FIGS. 4-5. The process begins at START 600 and continues along lines 602, 604 to decision block 606. At decision block 606, if the disc drive is not in an idle state, then the process continues along line 608 to active disc drive operations. If the disc drive is in an idle state at decision block 606, then the process continues along line 610 to provide re-accessing of a limited number of leading track portions that have reduced reliability.

Starting at line 608, the process continues to decision block 612. At decision block 612, if the disc activity is a read instruction, then the process continues along line 614 to action block 616. At action block 616, the read instruction is executed, and then the process continues along line 618, line 620 and line 604 to return to the decision 606. At decision block 612, if the disc activity is not a read instruction, then the process continues along line 622 to action block 624. At action block 624, a write instruction is executed to a selected data track, and then the process continues along line 626 to action block 628.

At action block 628, the write sector number is inserted into a write recovery queue list. After completion of action block 628, the process returns along line 630 and line 604 to decision block 606.

Starting at line 610, the process continues to decision block 640. At decision block 640, if the write recovery list queue is empty, then the process continues along line 642, line 644, line 620 and line 604 back to decision block 606. If the write recovery list queue is not empty, then the process continues along line 646 to action block 648. At action block 648, the data track identified at the head of the write recovery queue list is accessed, and the process continues along line 650 to an action block 652. At action block 652, the data track at the head of the queue is rewritten with an overlapping trailing path addition to the head path, which re-accesses the reduced reliability leading track portion to reduce errors. After rewriting the data track, the data track is removed from the head of the queue list. After completion of action block 652, the process continues along line 654, line 644, line 620 and line 604 to return to decision block 606. Idle time in the disc drive is effectively used to rewrite data tracks with active time use of the disc drive.

Figure 7:
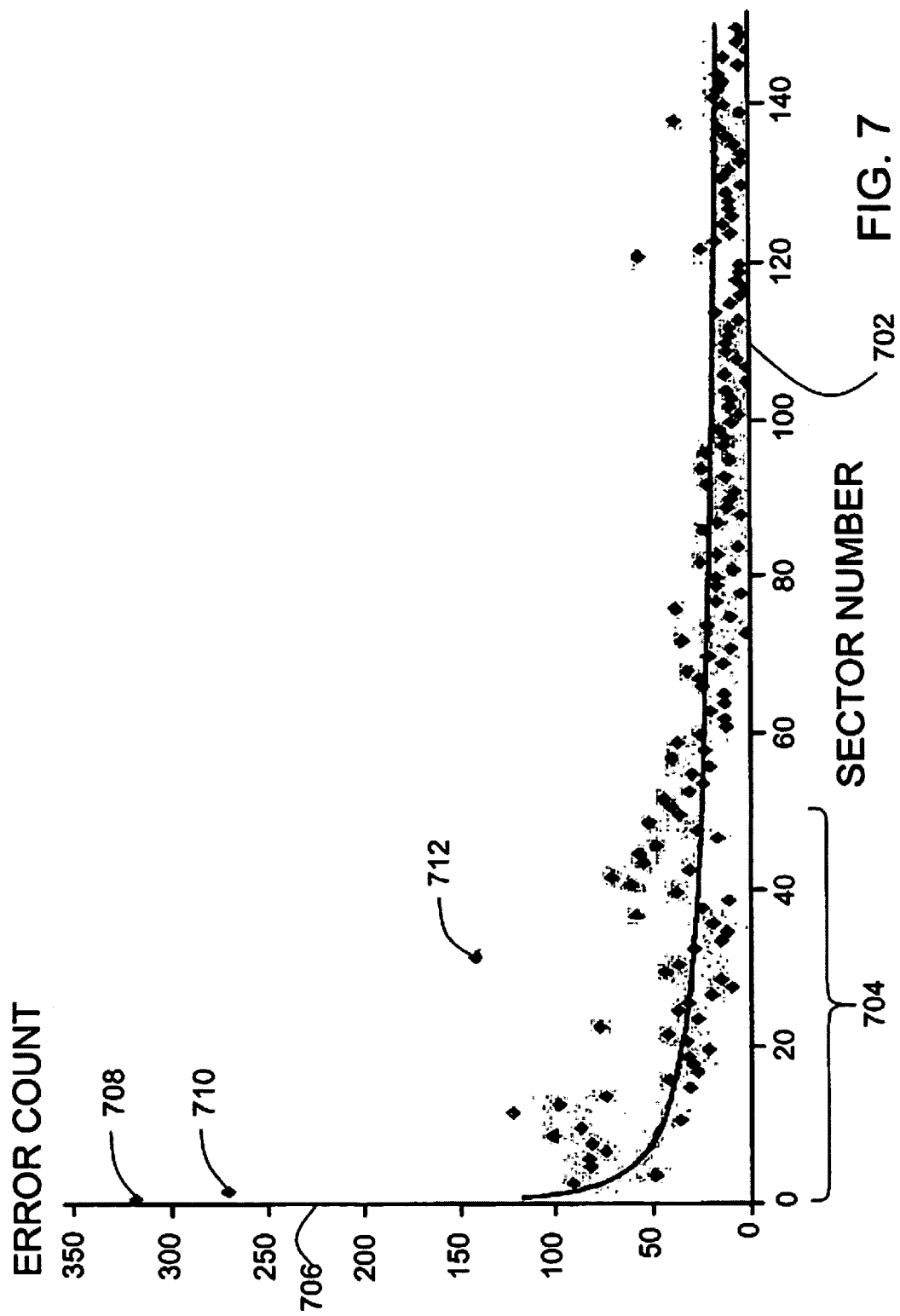
FIG. 7 illustrates a graph of error rates along a track in a data recording apparatus.

FIG. 7 illustrates a graph of error rates along a track with unreliable data access over a leading track portion (such as leading track portion 426 in FIG. 4) due to a thermal transient in CPTR. A horizontal axis 702 indicates sector numbers along a data track. A leading track portion 704 extends from sector number 0 to sector number 50, for example. Sector number 0 corresponds with a position such as points 428,434 in FIG. 4, for example. Sector number 50 corresponds with a position such as point 438 in FIG. 4, for example. Sector number 150 corresponds with a position such as point 442 in FIG. 4, for example.

A vertical axis 706 represents an error count sample for data sectors along the data track. As can be seen by error counts 708, 710, 712, for example, the error count in sectors 0-50 tends to be quite high due to thermal variation in CPTR, while the error count in sectors 51-150 tends to be lower. The sectors 0-50 are re-accessed after the read head is heated up so that the data in sectors 0-50 can be re-accessed with a lower error count, or in other words, a higher reliability.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data recording system while maintaining substantially the same functionality without departing from the scope and spirit of the present invention. In addition, although the preferred embodiment described herein is directed to a magnetic disc drive system for data storage, it will be appreciated by those skilled in the art that the teachings of the present invention can be applied to magneto-optical and optical magnetic data storage systems, and MRAM systems without departing from the scope of the present invention.

What is claimed is:

1. A data recording apparatus, comprising:
a rotatable surface having a generally circular first data track with a data track start location, the first data track having a first portion starting at approximately the data track start location;
a transducer movable along a path substantially over the first data track, the path including:
a path start location that corresponds with the data track start location;
a first segment of the path corresponding to the first portion of the first data track;
a path end location located such that one iteration of following the path passes over the first segment twice;
wherein the transducer writes first particular data to the first segment while writing from the path start location to the path end location during a continuous first writing of the path; and
wherein the transducer selectively follows the path and selectively writes the first particular data to the first segment a second time during the continuous first writing of the path when the path corresponds to the first data track having a reduced reliability access.

2. The data recording apparatus of claim 1, comprising:
a map identifying at least one data track; and
a controller operably programmed to control the motion of the transducer to selectively move along the at least one identified data track.

3. The data recording apparatus of claim 2, comprising:
an idle state of the data recording apparatus; and
the controller moves the transducer along the path during the idle state for the at least one identified path.

4. The data recording apparatus of claim 2, further comprising:
a tool to add a path to the map during an active state of the data recording apparatus.

5. The data recording apparatus of claim 2, further comprising a plurality of surface regions, wherein the map identifies the at least one path by surface region.

6. A data recording apparatus, comprising:
a surface having a plurality of concentric data tracks;
a head movable along paths substantially over the plurality of concentric data tracks; and
means for writing data on a first data track of the plurality of concentric data tracks such that at least a portion of the first data track is selectively written with first particular data twice while executing a single continuous write operation when the first data track is identified as having a reduced reliability access.

7. The data recording apparatus of claim 6, comprising:
a map identifying at least one path; and
a controller for controlling motion of the head to selectively move along a path corresponding to the first data track.

8. The data recording apparatus of claims 7, wherein a data path is added to the map during design of the data recording apparatus.

9. The data recording apparatus of claim 7, wherein the controller selectively moves along the path corresponding to the first data track during an idle state.

10. The data recording apparatus of claim 7, wherein the path corresponding to the first data track is added to the map during an active state of the data recording apparatus.

11. The data recording apparatus of claim 1, wherein the reduced reliability access is identified based on a bit error rate.

12. A method, comprising:
writing first particular data on a generally circular data track from a path start location to a path end location, the path defined such that one continuous iteration of following the path from the path start location to the path end location passes over a first portion of the data track twice; and
selectively writing the first portion of the data track with first particular data twice during a continuous writing of the path when the generally circular data track is identified as having a reduced reliability access.

13. The method of claim 12, further comprising:
rotating a surface including the generally circular track having a data track start location; and moving a transducer along the path substantially over the generally circular data track;
wherein the path start location corresponds to the data track start location.

14. The method of claim 13, further comprising:
identifying the path on a map; and
controlling motion of the transducer to selectively move along the path;
wherein a controller is operably programmed to control the motion of the transducer to selectively move along the path.

15. The method of claim 14 further comprising:
moving the transducer along the path during an idle state.

16. The method of claim 14, further comprising:
identifying the path by a surface region in the map.

17. The method of claim 14, further comprising adding a path to the map during an active state.

18. The method of claim 12, wherein the reduced reliability access is determined based on a bit error rate of at least a portion of the generally circular data track.

* * * * *